July 24, 1923.

C. H. GILL 1,462,808

MACHINE CONTROL MECHANISM

Original Filed March 21, 1921   6 Sheets-Sheet 5

Witness:
Stephen T. Rebora

Inventor:
Charles H. Gill

Patented July 24, 1923.

1,462,808

UNITED STATES PATENT OFFICE.

CHARLES H. GILL, OF CHICAGO, ILLINOIS.

MACHINE-CONTROL MECHANISM.

Application filed March 21, 1921, Serial No. 454,200. Renewed June 8, 1923. Serial No. 552,596.

*To all whom it may concern:*

Be it known that I, CHARLES H. GILL, a citizen of the United States, residing at Chicago, in the county of Cook and State of Illinois, have invented a new and useful Machine-Control Mechanism, of which the following is a specification.

My invention relates to methods and means for controlling the speed of a motor and the relative speed of a machine driven by said motor in such manner as to maintain the speed of the said machine substantially constant at a given rate throughout variations in the degree of resistance that may be offered to the operation of the said machine and for changing the said given rate of speed of the machine to such other given rate as may be desired by the operator at the will of the operator.

The objects of my invention are, first, to provide a governor actuated by the motor; second, to provide a controlling member actuated by the operator manually and adapted to co-act with the said governor for the joint control of the supply of motive power furnished to the said motor; third, to provide automatically acting transmission mechanism for transmitting the power developed by the said motor to the said machine and for varying the ratio of the speed of the machine to the speed of the motor in such manner as to decrease the said ratio in inverse proportion to increases in the resistance offered to the operation of the machine and to increase the said ratio in inverse proportion to decreases in the resistance offered to the operation of the machine; fourth, to provide means actuated by the said controlling member for reversing the direction of operation of the machine without reversing the direction of operation of the motor; fifth, to provide braking mechanism adapted to resist the operation of the said machine; and, sixth, to provide means actuated by the said controlling member for adjusting the said braking mechanism.

I attain these objects, and others as may hereinafter appear, by means of the mechanism illustrated in the accompanying drawings, in which—

Similar numerals refer to similar parts throughout the several views.

The transmission mechanism illustrated and described as a part of the mechanism employed in this embodiment of my invention is the same as that forming the subject of my application for Letters Patent, Serial Number 433,930, filed December 29th, 1920, and the brake mechanism employed herein is a slightly modified form of that forming the subject of my application for Letters Patent, Serial Number 440,195, filed January 26th, 1921. Reference may be had to those applications in connection with the present application.

The embodiment of my invention herein illustrated and described is constructed with special reference to use upon a motor driven vehicle, this being one of the uses to which it is adapted, but it should be understood that my invention is not limited to such use, since it is capable of controlling any motor driven machine. In describing this embodiment of my invention, I refer hereinafter to control of the speed of the motor through adjustment of the throttle valve, but it should be understood that a rheostat might be substituted for the throttle valve where the motor is electrically driven.

Referring to the drawings, 21 designates a control lever fixed to a shaft 22 and adapted to rotate that shaft when the lever 21 is moved. The lever 21 is provided with an upwardly projecting handle 23 for convenience in manually adjusting it and with a pointer portion 24 adapted to indicate graduations 25 upon a dial or scale plate 26 which is supported by a bracket 27 secured to the steering post 28. The steering post 28 is a stationary sleeve secured to the vehicle body or frame and having a steering sleeve 29 rotatably mounted therein, with a steering wheel 30 fixed to the upper portion of the steering sleeve 29 by means of spider arms 31. The scale plate 26 is held in position just above the spider arms 31 by the bracket 27 which is bent to pass over the steering wheel 30. The pointer portion 24 of the lever 21 extends slightly over the scale plate 26 so that it points to the graduations 25 thereon.

The shaft 22 is journaled in the frame 32 and passes through the steering sleeve 29, being freely rotatable therein, and the upper end of the shaft 22 projects slightly beyond the sleeve 29 to permit the lever 21 to be secured to the shaft 22 outside of the sleeve 29. The sleeve 29 is provided with the usual fittings 33 for operatively connecting it with the steering mechanism of the vehicle, none of which is illustrated herein as it forms no part of my invention and is not pertinent thereto.

A gear wheel 34 is fixed to the shaft 22 below the steering sleeve 29 and this gear wheel 34 is larger in diameter than the pinion 35 with which it engages. The pinion 35 is internally threaded to engage the threads 36 upon the shaft 37 mounting that pinion. A bracket 38 is secured to the frame 32 and provided with arms 39 having openings 40 through which the shaft 37 passes freely but which arms 39 prevent the pinion 35 from having longitudinal movement of or upon the shaft 37. Thus, rotation of the pinion 35 in either direction will cause longitudinal movement of the shaft 37 through the screw engagement of the pinion 35 with the shaft 37. An opening 41 in a part of the frame 32 is adapted to receive the lower end of the shaft 37 and to permit longitudinal movement of the shaft 37 therein while preventing rotation of that shaft through the engagement of a feather 43 on that shaft near its end with a keyway 42 in the opening 41.

A wide pinion 44 is provided with internal threads to engage the threads 36 on the shaft 37 which passes through the pinion 44. A sleeve 45 is slidably and rotatably mounted upon the shaft 37 and is secured to the pinion 44 for rotation and longitudinal movement therewith. The sleeve 45 is provided with circumferential rack teeth 46 throughout its length and these rack teeth 46 engage with a pinion 47 fixed upon the stem 48 of a throttle valve (not shown). This throttle valve is of the type of valve having a closed position of its stem but adapted to be opened by movement of the stem in either rotary direction from that closed position. Thus, movement of the sleeve 45 either upwardly or downwardly will open the throttle valve a corresponding degree when such movement occurs from a position in which the throttle valve is closed, thus permitting the passage of corresponding quantities of gas or steam to the engine and regulating its speed of operation accordingly. When the control lever 21 is at neutral position and when the motor is not running, the position of the shaft 37 and of the sleeve 45 thereon is such as to insure the pinion 47 and valve stem 48 being turned to the position necessary to secure complete closure of the throttle valve.

A gear wheel 49 is rotatably mounted as an idler on a shaft 50 which is journaled in the frame 32 and the gear wheel 49 engages with and is adapted to rotate the wide pinion 44 upon the threaded shaft 37 and to thus cause longitudinal movement of the pinion 44 and sleeve 45 upon that shaft through the screw engagement of the pinion 44 with the threads 36 of that shaft. A bevel gear wheel 51 is fixed to the gear wheel 49 for rotation therewith and is engaged by a bevel gear wheel 52 fixed upon a shaft 53 which is journaled in the frame 32. A gear wheel 54 is also fixed upon the shaft 53 and is engaged by a rack 55 at the end of an arm 56 which is slidably mounted in the frame 32.

An upwardly extending portion 57 of the arm 56 terminates in a bifurcated portion 58 the points of which portion 58 project into a circumferential groove 59 in a sliable collar 60 forming a part of a governor 61. The governor 61 is mounted upon a shaft 62 and is operated by and in proportion to the speed of rotation of that shaft. The governor 61 consists of a collar 63 which is fixed to the shaft 62 and the collar 60 which is feathered upon the shaft 62 for longitudinal movement of and upon that shaft while being secured for rotation with the shaft 62. Flat metal strips or springs 64 are fixed at each end to the collars 60 and 63 and each of the springs 64 is provided with a weight 65 fixed upon it at the center of its length. As this is a well known form of governor mechanism, it need not be described in further detail. As the rotary speed of the shaft 62 increases the weights 65 are moved further away from the center of rotation under the action of centrifugal force and the slidable collar 60 is correspondingly drawn toward the collar 63 against the resistance of the springs 64 and as the speed of the shaft 62 decreases the weights 65 approach the center of rotation and move the collar 60 away from the collar 63. The sliding movements of the collar 60 are communicated to the rack 55 through the groove 59 and arm 56 and this sliding movement of the rack 55 rotates the gear wheel 54 and, through the bevel gear wheels 52 and 51 and the gear wheel 49, rotates the pinion 44 and causes it to move upwardly or downwardly upon the shaft 37 according to the direction of the movement of the collar 60.

Thus, the speed of the motor or engine is controlled primarily by the position of the control lever 21 and consequent position of the shaft 37 and the sleeve 45, which moves longitudinally with the shaft 37. The speed of the motor is secondarily controlled, however, by the position of the sleeve 45 on the shaft 37 and relative thereto and this, in turn, is controlled by the speed of the shaft 62.

The mechanism for automatically adjusting the ratio of the rotary speed of the shaft 62 to the rotary speed of the driving shaft 66 might be that disclosed in my Letters Patent No. 1,410,747, dated March 28th, 1922, for friction transmission mechanism, or that disclosed in my application for Letters Patent, filed January 17th, 1921, Serial Number 437,801, but I have chosen to illustrate and describe one of the embodiments of the invention disclosed in my application for Letters Patent, filed December 29th, 1920, Serial Number 433,930.

A friction disk 67 is feathered upon the driving shaft 66 in such manner as to be slidable longitudinally of and upon that shaft but secured for rotation therewith. A spiral spring 68 surrounds the shaft 66 and presses one of its ends against a collar 69 which is adjustably secured to the shaft 66 by means of a set screw 70 and the other end of the spring 68 presses against the friction disk 67 and urges it away from the collar 69. The tension of the spring 68 can be adjusted by movement of the collar 69 and the securing of that collar by means of the set screw 70.

A friction wheel 71 is rotatably mounted upon a shaft 72 and is freely slidable longitudinally of and upon that shaft which is journaled for rotation in the frame 32. Shafts 73 and 74 are also journaled in the frame 32 and are parallel with and one upon each side of the shaft 72. The shaft 72 is provided with a keyway 75 therein and running longitudinally thereof and a collar 76 which loosely surrounds the shaft 72 is provided with an internally projecting feather 77 which engages with the keyway 75 and is thus locked to the shaft 72 for rotation therewith while being freely slidable longitudinally thereof and thereon. A gear wheel 78 is secured to the collar 76 for rotation and longitudinal movement therewith and the gear wheel 78 engages with and is adapted to rotate the pinions 79 and 80, which are respectively feathered upon the shafts 73 and 74, thus rotating those shafts. A gear wheel 81 is secured to the friction wheel 71 for rotation and longitudinal movement therewith and this gear wheel 81 engages with and is adapted to rotate pinions 82 and 83 which are internally threaded and which engage respectively with the threads upon the shafts 73 and 74 upon each of which one of the said pinions is mounted. The threads upon the shafts 73 and 74 are similarly inclined with respect to each other so that the internally threaded pinions 82 and 83, will travel upwardly or downwardly upon their respective shafts in unison with each other whenever they are rotated at a speed differing from the rotary speed of their respective shafts but in similar rotary directions to their said respective shafts. When rotated at like speeds, and in like directions, to their respective shafts, the pinions 82 and 83 will remain stationary in respect to their shafts.

The gear wheel 78 is somewhat greater in diameter than the gear wheel 81 and the pinions 79 and 80 are correspondingly smaller in diameter than the pinions 82 and 83, so that when the gear wheels 78 and 81 are rotating in the same direction and at the same rate of rotation the shafts 73 and 74 will be rotated at somewhat greater speed than the internally threaded pinions 82 and 83 thereon and the pinions 82 and 83 will, consequently, move upwardly upon their respective shafts through their screw engagements therewith.

A frame 84 embraces the friction wheel 71, the collar 76, the gear wheels 78 and 81 and the pinions 79, 80, 82 and 83, being provided with openings therein for the passage therethrough of the shafts 72, 73 and 74, and being adapted to slide upwardly or downwardly upon the said shafts. Washers 85 surround the various shafts within the frame 84 and maintain the elements therein in spaced positions relative to each other, so that when the pinions 82 and 83 move upwardly or downwardly the frame 84 and all the elements therein move therewith while retaining their positions relative to each other.

A spiral spring 86 surrounds the shaft 72 and abuts at its lower end against the gear wheel 78, pressing the collar 76 into frictional contact with the side of the friction wheel 71 and tending to bind the collar 76 against the friction wheel 71 in such manner as to cause the collar 76 to be rotated by the friction wheel 71 and with that wheel whenever the resistance to the rotation of the shaft 72 and the collar 76 feathered thereon is less than the resistance of the spring pressed collar 76 to slippage against the friction wheel 71. The tension of the spring 86 is adjusted by means of an externally threaded sleeve 87 which surrounds the shaft 72 and which engages with the threads in an internally threaded opening through the frame 84. The sleeve 87 is provided with a milled head 89 for adjustment and a set screw 90, working through an internally threaded opening in a part 91 of the frame 84 is adapted to hold the milled head 89 against movement at other times. A washer 92 surrounds the shaft 72 and is interposed between the lower end of the sleeve 87 and the upper end of the spring 86.

A bevel gear wheel 93 is fixed upon the shaft 72 and engages with a bevel gear wheel 94 fixed upon the shaft 62 which is journaled in the frame 32.

The brake device which is now to be described is the same, with unimportant modifications, as that disclosed in my application for Letters Patent for brake for vehicles, filed January 26th, 1921, Serial Number 440,195. In view of this, it is believed to be unnecessary to describe this device in complete detail, since reference may be had to the application named in connection with this application.

A pump casing 96 has a rotatable pump core 97 therein and the pump core 97 is secured upon a sleeve 98 which surrounds the shaft 62 but is not secured to that shaft. The end of the sleeve 98 is provided with a clutch member 99 which is adapted to engage with a clutch member 100 which is feathered upon the shaft 62 for slidable motion longitudinally of and upon that shaft but secured for rotation therewith. The clutch member 100 is provided with a sleeve portion 101 having a wide annular groove 102 therein. A ring 103 fits loosely around the sleeve portion 101 within the groove 102 and has a projection 104 to which is secured one end of a spiral spring 105, the other end of which is secured to the frame 32 in such manner that the spring 105 constantly urges the sleeve portion 101 and the clutch member 100 out of engagement with the clutch member 99.

A slotted arm 106 surrounds the sleeve portion 101, fitting loosely within the groove 102 and is capable of upward or downward motion within that groove but not of sidewise motion because of the elongated shape of the slot. The face of the arm 106 that is toward the ring 103 is smooth and level but the opposite face is provided with cam surfaces 107 upon its upper and lower portions, with a level or normal surface 108 between. When the arm 106 is in such position that the level surface 108 is central upon the sleeve portion 101, the spring 105 holds the clutch member 100 out of engagement with the clutch member 99, but when the arm 106 is moved upwardly or downwardly the cam surfaces 107 force the sleeve portion 101 and clutch member 100 along the shaft 62 and cause the clutch member 100 to engage the clutch member 99. Since the clutch member 100 is feathered upon and rotatable with the shaft 62, this will then lock the pump core 97 to the shaft 62 for rotation therewith.

The pump core 97 is provided with slots 109 in which pump blades 110 are adapted to slide, being normally forced partly out of the slots 109 by spiral springs 111 therein which urge the blades 110 to contact at their outer ends with the casing 96. The pump core 97 is of such width as to fit closely against the casing 96 at its sides and the slots 109 and blades 110 are of the same width as the core 97.

The core 97 is of lesser diameter than the inside diameter of the greater part of the casing 96, so that there exists an air space 112 between. At one point 113, however, the thickness of the casing 96 is increased to such an extent as to contact with the core 97 and on one side of the point 113 the thickness of the casing 96 diminishes gradually, forming a cam surface 114 and on the opposite side of the point 113 the thickness of the casing 96 becomes abruptly its normal or general thickness as throughout the balance of its circumference. An air inlet opening 115 passes through the thick portion of the casing 96 and opens into the air space 112.

An outlet opening 116 also passes through the casing 96 and a guide bar 117 crosses the opening 116 centrally and is curved to conform to and continue the cam surface 114 while preventing the blades 110 from entering the opening 116. Piping 118 is connected to the casing 96 and in communication with the opening 116 and is adapted to carry the air pumped by the rotation of the core 97 and blades 110 to a valve 119 which, in this construction, is situated at some distance from the pump. The piping 118 is provided with a safety or blow-off valve 120 which can be regulated to permit the escape of air from the piping when it becomes compressed beyond the degree for which the valve 120 is set.

The valve 119 consists of a cylindrical casing 121 having circular openings in opposite sides thereof, one of these openings 122 being for the escape of air and the other opening 123 being for the ingress of air into the valve. The piping 118 connects the opening 123 with the pump. A valve core 124 fits closely within the casing 121 and has a cylindrical opening 125 therethrough so adjusted that its opposite ends will register with the openings 122 and 123 when the core 124 is in normal position.

The core 124 is rotatably mounted in the casing 121 upon a shaft 126 to which it is fixed and which shaft 126 is journaled in the frame 32. A pinion 127 is also fixed upon the shaft 126 and is adapted to engage with and be rotated by a segmental gear wheel 128, which is fixed upon the shaft 22, whenever the shaft 22 is rotated so as to bring a toothed segment into position to engage the pinion 127. An arm 129 is secured to the shaft 126 and is hingeably secured at its opposite end to a link 130, the opposite end of which link 130 is hinged to one end of an arm 131. The arm 131 is pivoted at near its center upon the frame 32 by means of a pin 132 and an extension 133 of the slotted arm 106 is hinged to the arm 131 at the end opposite to that of the link 130. Thus, movement of the shaft 126 in rotation and in opening or closing the valve 119 acts, through the arms and links just enumerated, to raise or lower the slotted arm 106 and to thus engage or disengage the clutch members 99 and 100. Since the valve 119 is of the type that may be opened by rotation of its core in either direction, and since movement of the slotted arm either upwardly or downwardly from normal position engages the clutch members and thus starts the pump to operating, this pneumatic braking means may become effective by rotation of the shaft 22 in either direction from a certain point.

The shaft 62 does not connect directly with the vehicle wheels or other mechanism it is to drive but connects with reversing mechanism 134 and drives a shaft 135 therethrough in either the same direction of rotation or in the opposite rotary direction according to the regulation of the reversing mechanism 134. Since this reversing mechanism may be of any of the well known forms, and since it forms no part of my invention, I have illustrated it as enclosed in a casing, without showing any details of its construction. Since the method of adjusting this reversing mechanism for giving forward or backward rotation to the shaft 135 does form a part of my invention, I illustrate the means for so adjusting it.

A lever 136 is adapted to change the relation of the gears comprising the reversing mechanism 134 so as to cause the rotary motion of the shaft 62 in one direction to be transmitted to the shaft 135 as rotary motion in either the same or the opposite direction according to the position of the lever 136. This lever 136 is bent at right angles near its lower end and that end is hingeably secured to a sleeve 137 which passes through an opening 138 in a part of the frame 32 and is feathered therein in such manner as to have free longitudinal sliding movement but to be held against rotation. The sleeve 137 is internally threaded and a shaft 139, being provided with threads 140 for a portion of its length, passes through the sleeve 137 and engages with the threads therein. The shaft 139 is journaled in the frame 32 and has a bevel gear wheel 141 fixed to it near its end opposite to that carrying the threads 140. The bevel gear wheel 141 engages with and is rotatable by a bevel gear wheel 142 which is secured to a shaft 143 which is journaled in the frame 32. A pinion 144 is also secured upon the shaft 143 and is adapted to be engaged by the segmental gear wheel 128 and rotated thereby whenever the shaft 22 is rotated so as to bring the toothed segment 149 of the segmental gear wheel 128 into engagement with the pinion 144.

Figure 1:
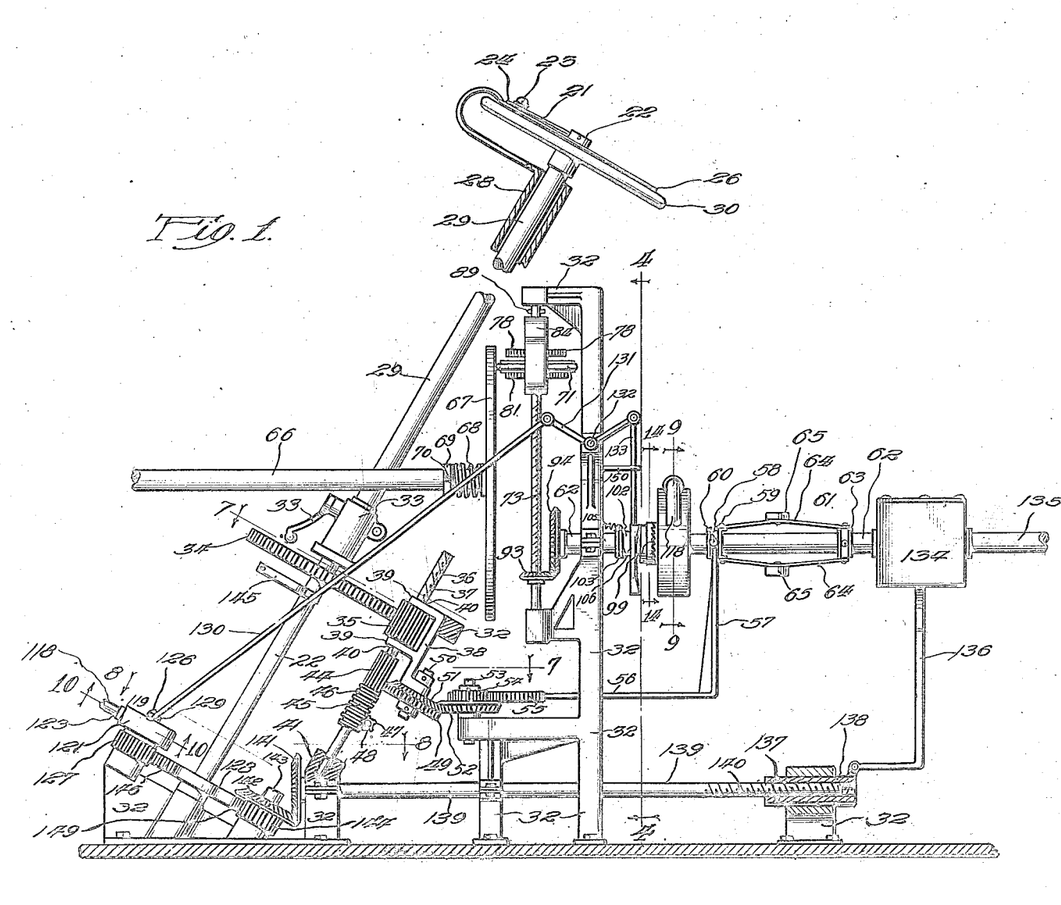
Figure 1 is a side elevation and partly sectional view of the entire mechanism.
Figures 2, 3:
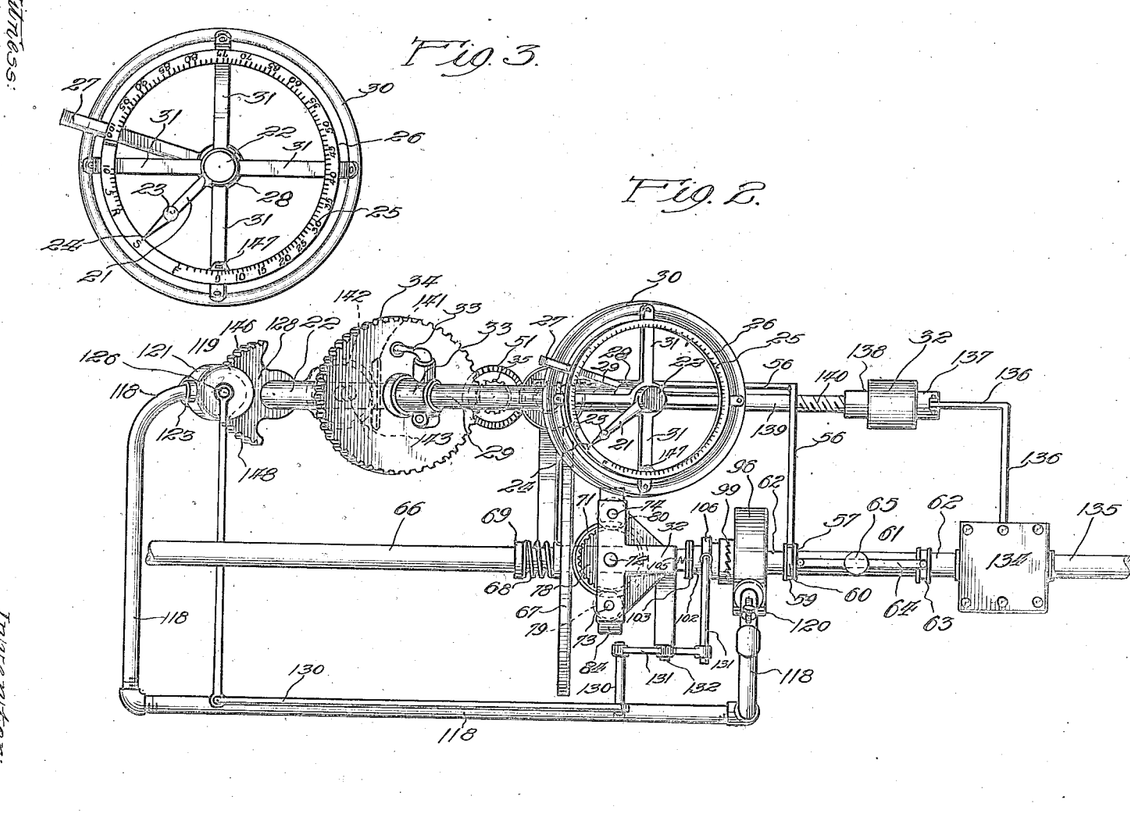
Figure 2 is a plan view of the same.
Figure 3 is an enlarged detail plan view of the steering wheel and control lever.
Figures 4, 5:
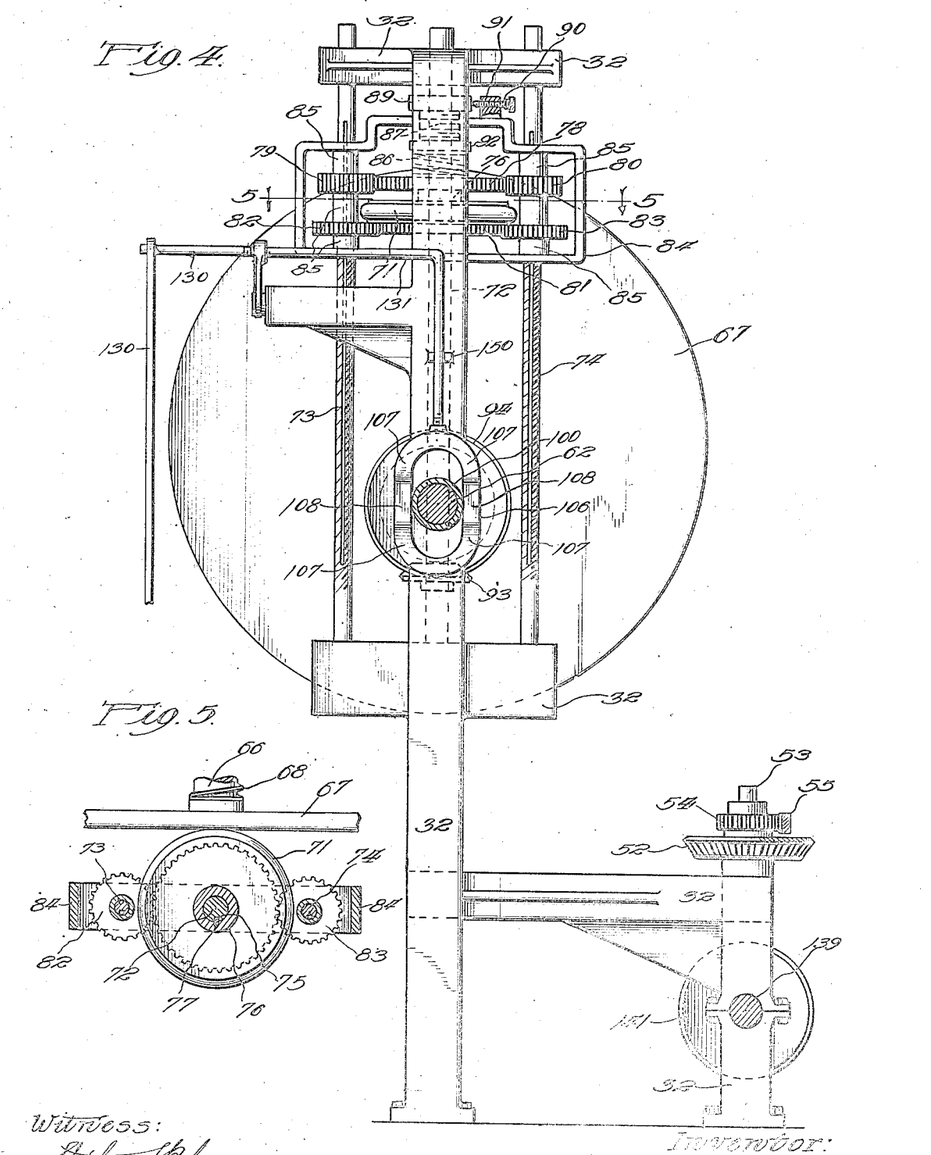
Figure 4 is a section on the line 4—4 of Figure 1 and enlarged.
Figure 5 is a section on the line 5—5 of Figure 4.
Figure 6:
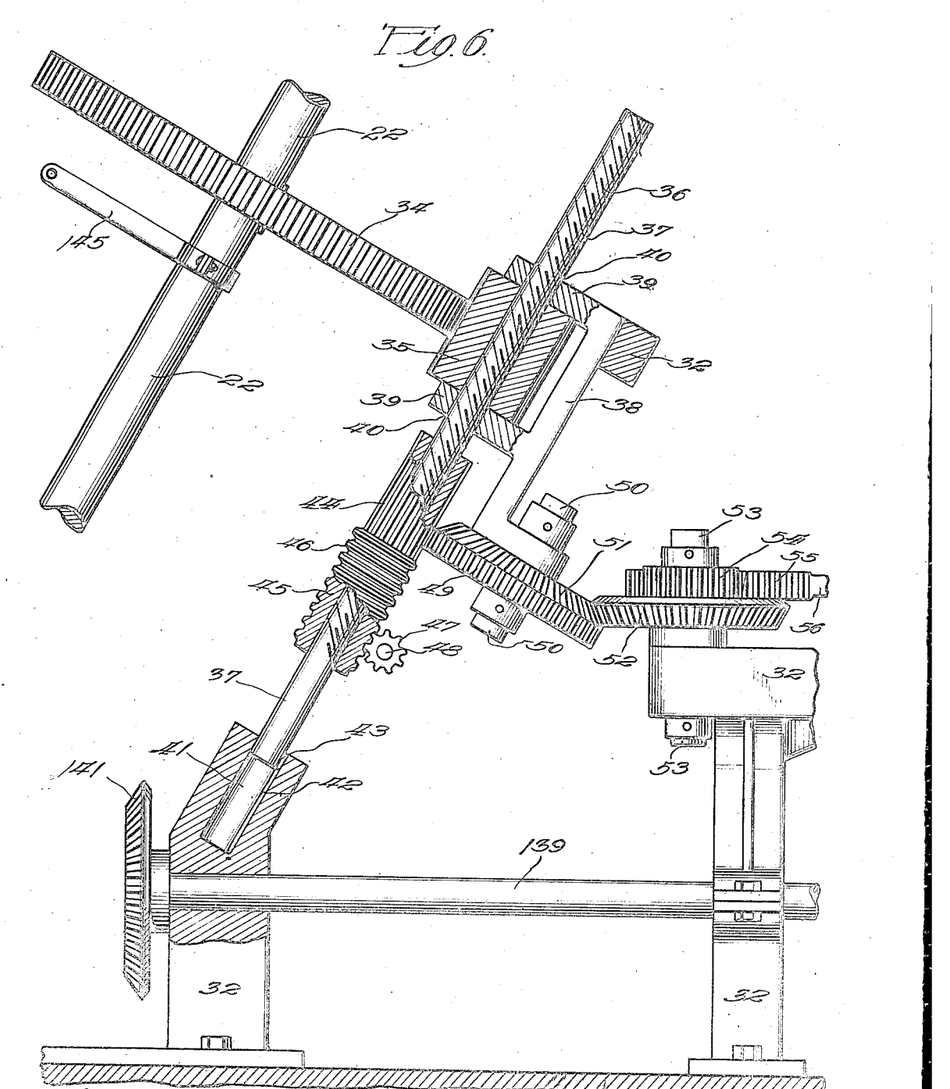
Figure 6 is an enlarged side elevation and partly sectional view of the throttle controlling mechanism.
Figures 7, 8:
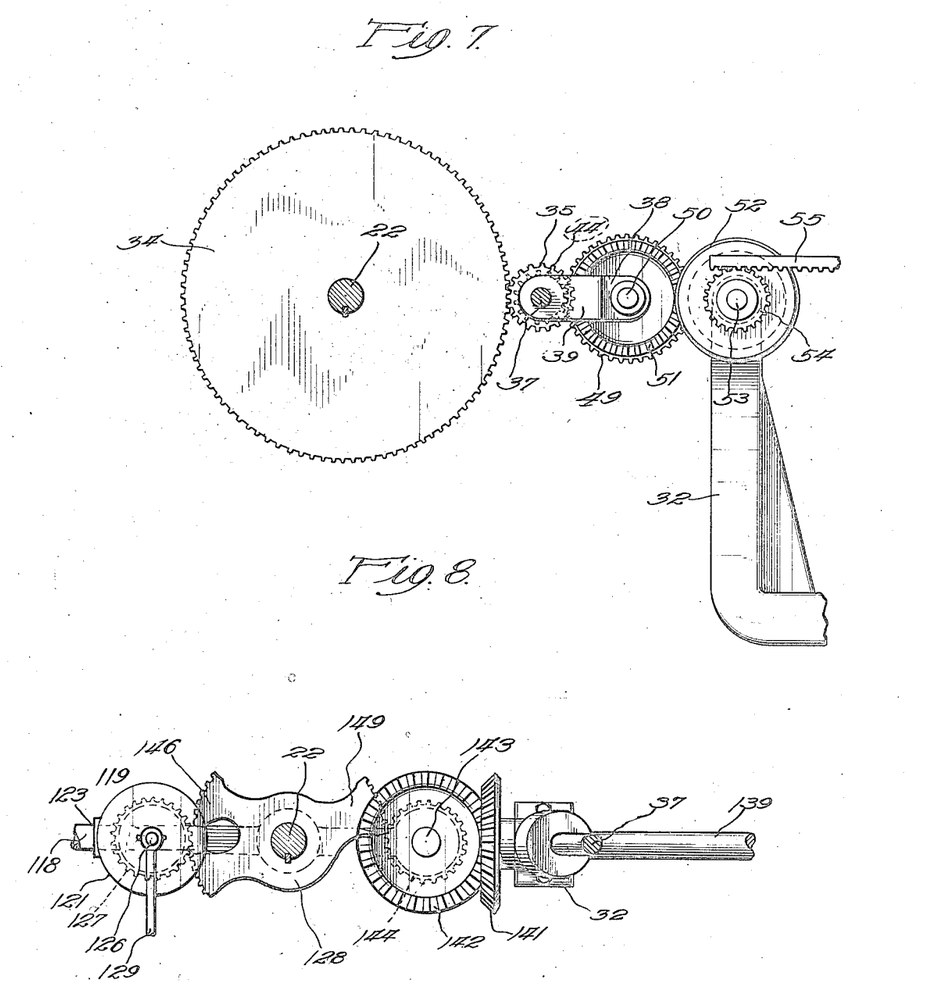
Figure 7 is an enlarged plan section on the line 7—7 of Figure 1.
Figure 8 is an enlarged plan section on the line 8—8 of Figure 1.
Figures 9, 10, 11, 12, 13, 14:
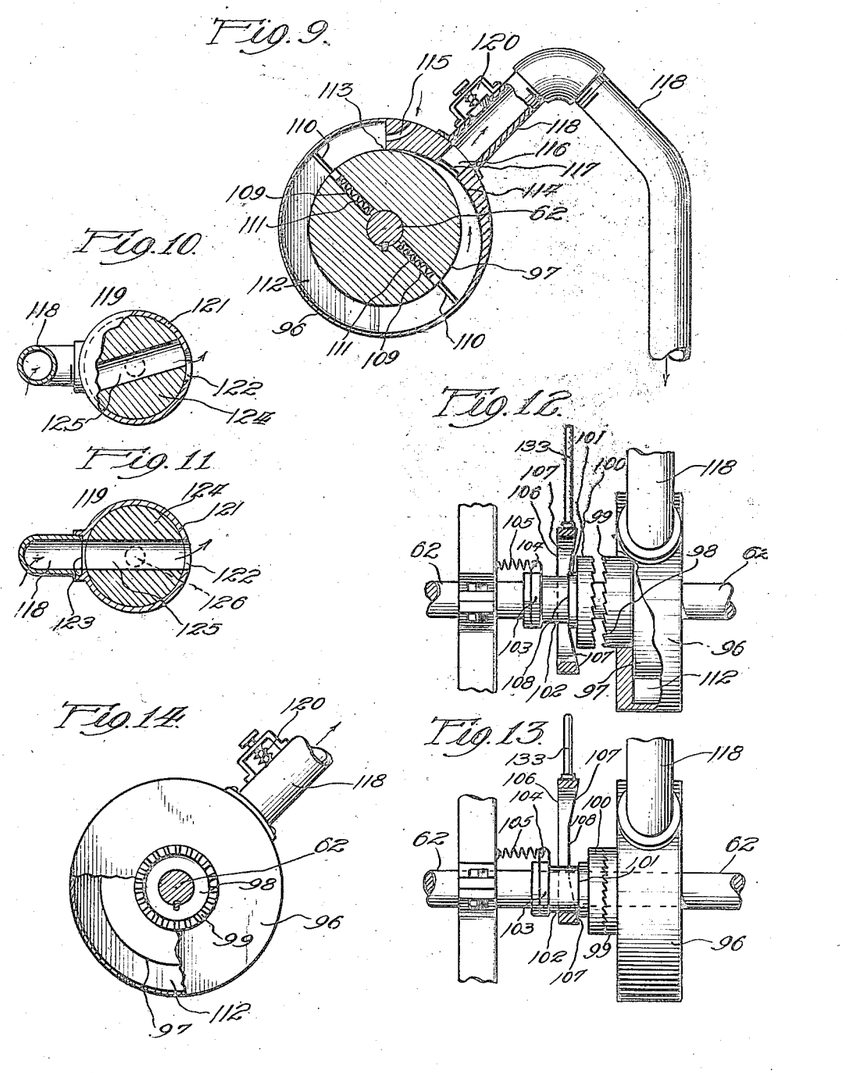
Figure 9 is an enlarged section on the line 9—9 of Figure 1.
Figure 10 is an enlarged section on the line 10—10 of Figure 1.
Figure 11 is another view of the same showing the valve fully open.
Figure 12 is an enlarged side elevation and partly sectional view of the brake pump and clutch mechanism showing the clutch in inoperative position.
Figure 13 is a similar view showing the clutch engaged.
Figure 14 is a section taken on the line 14—14 of Figure 1.

When the pointer 24 of the lever 21 stands so that it indicates "S" upon the scale plate 26, as illustrated in Figure 3, the throttle valve is completely closed, the motor is stopped, the clutch members 99 and 100 are engaged so that the pump would be operating if the shaft 62 was rotating, the valve 119 is fully closed and the reversing mechanism is set so that the shaft 135 is adapted to be rotated in the same direction as the shaft 62.

Now, should the lever 21 be moved so that the pointer 24 indicates "F," and which means that the vehicle is to go forward, the partial rotation of the shaft 22 and consequent partial rotation of the gear wheel 34 will rotate the internally threaded pinion 35 and thus cause the threaded shaft 37 to be moved upwardly somewhat, carrying with it the internally threaded pinion 44 and the sleeve 45, rotating the pinion 47 by means of the engaging circumferential rack teeth 46 on the sleeve 45 and slightly opening the throttle valve thereby, but not sufficiently to permit starting of the motor. As the lever 21 is further advanced in the same direction, however, and as the throttle valve is correspondingly further opened, the motor may be started by using any of the well known starting mechanisms at the will of the operator or such starting mechanism may be set in motion through a link connection or electrical contact connection with the arm 145 projecting from the shaft 22.

As the lever 21 is moved from the position "F" toward the position "5" on the scale plate 26, the segment 146 of the segmental gear wheel 128 is brought into engagement with the pinion 127 and the shaft 126 is rotated sufficient to fully open the valve 119, thus relieving the machine of all braking effect. Further movement of the lever 21 in the same direction will not affect the valve 119 since no segment of the segmental gear wheel 128 will then engage the pinion 127. At the same time that the rotation of the pinion 127 and shaft 126 is opening the valve 119, this same rotation of the shaft 126 is causing movement of the arm 129 and, through the link 130 and arm 131 and extension arm 133, is raising the slotted arm 106 so that this slotted arm 106 attains a centered position in the groove 102 at the same time that the valve 119 attains its full opening, and thus the pump becomes disconnected from the shaft 62 through the disconnection of the clutch members 99 and 100.

The motor having been started is rotating the shaft 66 and the friction disk 67 which is feathered thereon and pressed against the periphery of the friction wheel 71 by the spiral spring 68. The friction wheel 71 is rotated through its frictional engagement with the friction disk 67 and rotates the internally threaded pinions 82 and 83 by means of the gear wheel 81 which is secured for rotation with the friction wheel 71. At the same time, the friction wheel 71 causes the collar 76 and its attached gear wheel 78 to rotate with it through the frictional binding of that collar against the side of the friction wheel 71 under pressure of the spiral spring 86. The tension of the spring 86 should be adjusted by means of the threaded sleeve 87 so that the frictional grip of the collar 76 against the friction wheel 71 is sufficiently strong as to slip only under a load of resistance to its rotation that is but slightly less than would cause the friction wheel 71 to slip in its frictional engagement with the friction disk 67. As the collar 76 is feathered up on the shaft 73 it rotates that shaft with it and, through the bevel gear wheels 93 and 94, also rotates the shaft 62.

The gear wheel 78 secured for rotation with the collar 76 engages and rotates the pinions 79 and 80 upon the shafts 73 and 74 respectively and, because of the pinions 79 and 80 being feathered upon their respective shafts, rotates those shafts, each in the opposite direction to the other. As the shafts 73 and 74 are rotated somewhat faster than the internally threaded pinions 82 and 83 which engage the threads on said shafts, and as the threads on each of said shafts are oppositely disposed to the threads on the other shaft, the pinions 82 and 83 will spiral upward upon their shafts, carrying the frame 84 and all of its contents with them, until a point is reached where the resistance offered to the rotation of the collar 76 with the friction wheel 71 overcomes the binding force of the spring 86 and causes the collar 76 to slip somewhat, thus reducing its rotary speed and tending to equalize the rotary speeds of the shafts 73 and 74, driven by the collar 76 through the gear wheel 78, and the pinions 82 and 83, driven by the friction wheel 71 through the gear wheel 81. Whenever this slippage becomes sufficient in degree to equalize these speeds, the upward travel of the frame 84 and contents will cease and the frame 84 will remain stationary. Should the resistance to the rotation of the collar 76 decrease, the upward travel would recommence. Should the resistance further increase, the slippage of the collar 76 would become more pronounced and the rotary speeds of the shafts 73 and 74 fall below the rotary speeds of the pinions 82 and 83, with the result that the frame 84 and its contents would move downwardly until a position was attained where the slippage of the collar 76 was only sufficient to equalize the speeds of the shafts 73 and 74 and the pinions 82 and 83. Thus, the ratio of rotary speed of the shaft 62 to the rotary speed of the shaft 66 is automatically adjusted to meet the conditions of resistance offered by the load.

As the shaft 62 rotates, the weights 65 which rotates therewith tend to move furthere away from the center of rotation under the action of centrifugal force and to overcome the resistance exerted by the springs 64 to their outward movement. The outward movement of the weights 65 cause the feathered collar 60 to slide along the shaft 62 toward the fixed collar 63 and, through the engagement of the bifurcated end portion 58 of the arm 56 with the annular groove 59 in the collar 60, the arm 56 is moved with the collar 60, causing the rack 55 on the end of the arm 56 to be moved therewith and to rotate the gear wheel 54 with which that rack engages. Through the rotation of the shaft 53, to which the gear wheel 54 is fixed, the bevel gears 52 and 51 and the gear wheel 49 are also rotated by the movement of the collar 60. The gear wheel 49 is in engagement with the wide and internally threaded pinion 44 and, therefore, causes that pinion to rotate and to travel upward upon the threaded shaft 37, carrying with it the sleeve 45 which is secured thereto and causing the circumferential rack teeth 46 of the sleeve 45 to rotate the pinion 47 and the valve stem 48 and to tend toward closing the throttle valve. Thus, should the pointer 24 be indicating the numeral "5" upon the scale plate 26, meaning that a speed of five miles per hour is desired for the vehicle or machine, and should the rotation of the shaft 22 in bringing the pointer to that position have opened the throttle valve more than enough to cause the motor to develop a speed that, when adjusted by the automatic transmission mechanism to meet the requirements of leverage needed to overcome the resistance offered to the rotation of the shaft 62, will give the shaft 62 the rotary speed to cause the vehicle to attain that speed, then the outward movement of the weights 65 will cause corresponding rotation of the pinion 44 and upward travel of the same upon the threaded shaft 37, with closure of the throttle valve to the degree required to reduce the motor speed to that required to transmit to the shaft 62 rotary speed at a rate to produce forward movement of the vehicle at the rate of five miles per hour.

With the pointer 24 still indicating five miles per hour, if a hill or other obstacle should be met with to increase the resistance offered to the rotation of the shaft 62, the automatic transmission mechanism will at once adjust the ratio of the speed of the shaft 62 to the speed of the shaft 66 to the extent necessary to overcome that added resistance, consequently slowing the rotation of the shaft 62. As this slowing of the shaft 62 occurs, the weights 65 will approach each other to a degree corresponding to the reduction in rotary speed of the shaft 62 and this will cause the further opening of the throttle valve, as will now be understood from the preceding part of this description. Such opening of the throttle will cause the motor to develop the additional speed required to keep the shaft 62 rotating at the speed that is equivalent to five miles per hour of vehicle travel. Should this extra opening of the throttle, or any other cause, make the motor to develop a speed in excess of the required speed, this would be immediately adjusted by the action of the weights 65 and movement of the pinion 44.

Now, should the pointer be further moved so as to indicate, for example, the numeral "25" on the scale plate 26, the additional rotation of the shaft 22 in bringing the pointer to that position will open the throttle valve correspondingly more and will cause the motor to develop correspondingly greater speed, which speed will be checked or regulated by the action of the weights 65, as before described.

Reductions in speed would, obviously, be made by moving the pointer in the opposite direction. As the braking mechanism begins to be operative from the time the pointer moves from the position of "5" toward the position "S", a too sudden movement of the lever 21 from a high speed position to a point on the scale below "5" would check the momentum of the vehicle so suddenly as to be dangerous. Therefore, a detent consisting of a leaf spring 147 secured at one end to the scale plate 26 and bent to form a hump, is interposed in the pathway of the lever 21 at the point where the pointer 24 indicates "5", and this detent makes it necessary for the operator to exert extra force in pushing the lever 21 past it. For example, if the vehicle was travelling at a rate of twenty-five miles per hour and it was desired to stop suddenly, the operator would be apt to quickly throw the lever 21 toward the position "S". If there was no detent at "5", the result would be that the brake valve 119 would be fully closed and the pump started to operating to compress air which, having no escape, would bring the vehicle to a stop in the same manner as the application of an ordinary emergency brake. The safety valve 120 would operate to allow the escape of the compressed air but not until the resistance it offered to the further turning of the shaft 62 had reached a point of braking effect upon that shaft that would check the momentum of the vehicle too suddenly for anything but an emergency. But the detent acts as a reminder and safety stop so that the operator may throw the lever 21 that far without any check when he wishes to stop and is reminded to move it more slowly from that point toward the point "F" or point "S" on the scale.

Thus, if the vehicle were travelling at twenty-five miles per hour and the lever 21 was then thrown quickly over to the point "5", the throttle valve would be almost completely closed for the instant because of the movement of the shaft 37 upwardly and because the pinion 44 would already have been moved on the shaft 37 through the action of the weights 65. Thus, the motor would be slowed down very greatly and would adjust itself through the action of the weights 65 to drive the shaft 62 at a speed equivalent to five miles per hour of vehicle travel. As the lever 21 is further moved in the same direction the throttle valve is further closed and the clutch members 99 and 100 are engaged to operate the pump and compress air, while the brake valve 119 is progressively closed. Thus, greater and greater resistance to the rotation of the shaft 62 is supplied while the motor is more and more reduced in speed until, when the pointer 24 indicates "F" on the scale plate 26, the motor will be running very slowly, with the throttle valve nearly closed, and the friction wheel 71 will have reached a point opposite the center of rotation of the friction disk 67 and will not be rotated, so that the shaft 62 will be stationary and the vehicle at a stop, since the vehicle driving wheels cannot rotate without rotation of the shaft 62 and that shaft is prevented from rotation by the resistance thereto supplied by the air compressor and the closed valve 119. It should be understood that the valve 119 becomes completely closed as the pointer 24 reaches the point "F".

Thus, while the pointer 24 indicates "F", the vehicle is at a standstill but the motor is running slowly. The vehicle can be started to travelling forwardly again by merely moving the lever 21 to indicate the speed desired. Should it be desired to stop the motor, the pointer 24 is moved to "S" and the throttle is fully closed.

When it is desired to operate the vehicle backward, the pointer 24 is moved to indicate "R" and then as much further in that direction as to correspond to the rearward speed desired. Should it be desired to run the vehicle backward when the motor is stopped and the pointer 24 indicating "S", the pointer must be moved to indicate some speed beyond "R" and the starting mechanism actuated. Should the motor be running and the pointer 24 indicating "F" when a reverse movement of the vehicle is desired, a quick motion of the lever 21 to bring the pointer 24 to indicate "R" or any graduation beyond, will accomplish the purpose without stopping the motor, since the throttle valve will be only closed for the instant that the pointer 24 is passing the point "S".

During the movement of the pointer 24 from the position "R" to the position "5" beyond "R", the throttle valve is opened in the same way as in moving the pointer from the position "F" to "5", except that the throttle is then opened by further rotation of the stem 48 in the same direction that tended to close it before. The throttle valve being of the type of valve that has a central closed position and is opened by movement in either direction from that position, is capable of acting in this manner.

During the movement of the pointer 24 from the position "R" to the position "5", beyond "R", the brake valve 119 is opened by the engagement of the segment 148 of the segmental gear wheel 128 with the pinion 127 on the valve shaft 126. At the same time, the movement of the arm 129 and its connecting arms and links moves the slotted arm 106 to central position in the groove 102 and allows the spring 105 to retract the clutch member 100 and disengage the pump from operation.

As the pointer 24 moves from the position "S" to the position "R", the segment 149 of the segmental gear wheel 128 engages and rotates the pinion 144 on the shaft 143 and also causes rotation of the bevel gear wheel 142 which is fixed on that shaft. Through engagement of the bevel gear wheel 142 with the bevel gear wheel 141 on the shaft 139, the shaft 139 is rotated, causing the sleeve 137 to be slid toward the bevel gear wheel 141 through the engagement of the threads 140 on the shaft 139 with the internal threads of the sleeve 137, and this adjusts the reversing lever 136 in such manner as to change the relations of the gears constituting the reversing mechanism 134 so that the shaft 135 will be driven by the shaft 62 in an opposite rotary direction. In similar manner, as the pointer 24 moves from the position "R" to the position "S", the operation just described is reversed with the result of adjusting the reversing mechanism 134 to transmit rotary motion from the shaft 62 to the shaft 135 in the same direction as the rotation of the shaft 62.

It will be seen from the foregoing that my invention provides a construction wherein a single control lever operates to control practically all of the functions of the vehicle or machine by replacing the usual throttle lever, clutch pedal, gear shifting pedals, accelerator pedal, ordinary brake pedal, emergency brake pedal or lever and reversing pedal or lever. It further dispenses with the need of a speedometer for indicating the speed of travel of the vehicle. It may obviously also serve to operate motor starting mechanism and to advance or retard the igniting spark progressively as the lever 21 is moved in the direction to cause increased speed or in the opposite direction.

It is also evident that numerous departures from the specific construction described and illustrated in this application might be made without departing from the spirit of my invention. For this reason, therefore, I do not wish to be limited to the specific construction disclosed or to be bound by any limitations except such as may be imposed by the prior state of the art or by the following claims.

I claim:

1. In machine control mechanism, the combination of a driven shaft, a driving shaft, automatic means for varying the ratio of the rotary speed of the said driven shaft to the rotary speed of the said driving shaft in inverse proportion to the degree of resistance offered to the rotation of the said driven shaft, automatic means for varying the rotary speed of the said driving shaft in such manner as to maintain a given rate of rotary speed of the said driven shaft throughout all variations in the ratio of the rotary speed of the said driven shaft to the rotary speed of the said driving shaft, a control lever adapted to be positioned at the will of the operator, and means controlled by the position of the said control lever for changing the said given rate of rotary speed of the said driven shaft.

2. In machine control mechanism, the combination of a driven shaft, a driving shaft, means for varying the ratio of the rotary speed of the said driven shaft to the rotary speed of the said driving shaft, automatic means for varying the rotary speed of the said driving shaft to maintain a given rate of rotary speed of the said driven shaft throughout all changes in the said ratio, a control lever adapted to be positioned at the will of the operator, and means controlled by the position of the said control lever for changing the said given rate of rotary speed of the said driven shaft.

3. In machine control mechanism, the combination of a driven shaft, automatic speed changing gearing adapted to transmit the rotary motion of the motor to the said driven shaft at varying ratios controlled by the resistance offered to the said driven shaft, and automatic means for governing the speed of the said motor to maintain the speed of the said driven shaft at a given rate throughout all changes in the ratio of the speed of the said driven shaft to the speed of the said motor.

4. In machine control mechanism, the combination of a driven shaft, automatically governed speed changing gearing adapted to transmit rotary motion from the motor to the said driven shaft so that the speed of the said driven shaft is always inversely proportional to the resistance offered thereto and may be at any of various ratios to the speed of the said motor, and automatic means adapted to so govern the speed of the said motor as to cause the said motor to drive the said driven shaft at a constant rate of speed regardless of the speed ratio of the said driven shaft to the speed of the said motor.

5. In machine control mechanism, the combination of a driven shaft, speed changing gearing adapted to transmit rotary motion from the motor to the said driven shaft in such manner as to cause the said motor to drive the said driven shaft at any of various ratios of speed to the speed of the said motor inversely proportional to the degrees of resistance offered to the rotation of the said driven shaft, automatic means adapted to so govern the speed of the said motor as to cause the said motor to drive the said driven shaft at a determined constant rate of speed regardless of the ratios of speed between the said driven shaft and the said motor varying, and means under the control of the operator for selecting the determined constant rate of speed at which the said motor must maintain the said driven shaft.

6. In machine control mechanism, the combination of a motor operated driving shaft, a driven shaft, automatically operating speed changing gearing adapted to very the ratio of the speed of the said driven shaft to the speed of the said driving shaft in inverse proportion to the degrees of resistance offered to the rotation of the said driven shaft, and governing means adapted to vary the speed of the said driving shaft inversely proportionately to each variation in the speed of the said driven shaft.

7. In machine control mechanism, the combination of a motor driven shaft, means under the control of the operator for regulating the speed of the said motor driven shaft, automatically operating change speed gearing, and means controlled by the operation of said change speed gearing for varying the speed of the said motor driven shaft inversely to each change of speed effected by said change speed gearing.

8. In machine control mechanism, the combination of a motor operated driving shaft, means under the control of the operator for regulating the speed of the said driving shaft, a driven shaft, automatic means adapted to vary the ratio of the speed of the said driven shaft to the speed of the said driving shaft in inverse proportion to each change in the degree of resistance offered to the rotation of the said driven shaft, and automatic means adapted to vary the speed of the said driving shaft in inverse proportion to each change in the speed of the said driven shaft.

9. In machine control mechanism, the combination of a motor operated driving shaft, a driven shaft, automatic means adapted to vary the ratio of the speed of the said driven shaft to the speed of the said driving shaft in inverse proportion to each change in the degree of resistance offered to the rotation of the said driven shaft, means under the control of the operator and adapted to adjust the said mechanism to rotate the said driven shaft at any desired constant speed, and automatically operating means adapted to vary the speed of the said driving shaft in inverse proportion to each change in the speed of the said driven shaft in such manner as to maintain the speed of the said driven shaft substantially constant at the rate determined by the position of the said means under the control of the operator.

10. In machine control mechanism, the combination of a motor operated driving shaft, a driven shaft, automatic means adapted to vary the ratio of the rotary speed of the said driven shaft to the rotary speed of the said driving shaft in inverse proportion to each change in the degree of resistance offered to the rotation of the said driven shaft, automatic means adapted to vary the speed of the said driving shaft in inverse proportion to each change in the speed of the said driven shaft, and means under the control of the operator for regulating the normal speed of the said driving shaft in such manner that the constant speed of the said driven shaft maintained through the operation of the last named automatic means may be at the rate desired by the operator.

11. In machine control mechanism, the combination of a motor operated driving shaft, a driven shaft, automatic means adapted to vary the ratio of the speed of the said driven shaft to the speed of the said driving shaft in inverse proportion to each change in the degree of resistance offered to the rotation of the said driven shaft, means under the control of the operator adapted to regulate the normal speed of the said driving shaft, and automatic means adapted to vary the speed of the said driving shaft above or below the said normal speed in inverse proportion to each change in the speed of the said driven shaft.

12. In machine control mechanism, the combination of a control lever, an indicator carried by said lever, a graduated plate adapted to have any of its graduations indicated by the said indicator when the said lever is moved to proper position therefor, a motor operated driving shaft, a driven shaft, automatically shiftable gearing adapted to transmit rotary motion from said driving shaft to said driven shaft at varying ratios of speed determined by the degrees of resistance offered to the rotation of the said driven shaft, means controlled by the position of the said lever for regulating the normal speed of the said driving shaft, and automatic means adapted to vary the speed of the said driving shaft above or below the said normal speed in inverse proportion to each change in the speed of the said driven shaft in such manner as to maintain the speed of the said driven shaft substantially constant at the rate indicated by the graduation on the said graduated plate by the said indicator carried by the said control lever.

13. In machine control mechanism, the combination of a motor operated driving shaft, a driven shaft, gearing adapted to be adjusted to transmit the rotary motion of the said driving shaft to the said driven shaft at any of various speed ratios therebetween, automatic means for adjusting the said gearing to maintain the ratio of the speed of the said driven shaft to the speed of the said driving shaft inversely proportional to the degree of resistance offered to the said driven shaft, means under control of the operator adapted to regulate the normal speed of the said driving shaft and automatic means adapted to vary the speed of the said driving shaft above or below the said normal speed in inverse proportion to each change in the speed of the said driven shaft.

14. In machine control mechanism, the combination of a motor operated driving shaft, a driven shaft, gearing adapted to be adjusted to transmit rotary motion from the said driving shaft to the said driven shaft at any of various speed ratios therebetween, automatic means for adjusting the said gearing to vary the ratio of the speed of the said driven shaft to the speed of the said driving shaft inversely to variations in the degree of resistance offered to the said driven shaft, and means jointly controlled by the operator and by the speed of the said driven shaft for regulating the speed of the said driving shaft in such manner as to maintain the speed of the said driven shaft at whatever substantially constant speed rate may be willed by the operator.

15. In machine control mechanism, the combination of a motor operated driving shaft, a driven shaft, automatic means adapted to vary the ratio of the speed of the said driven shaft to the speed of the said driving shaft in inverse proportion to each change in the degree of resistance offered to the rotation of the said driven shaft, and means jointly controlled by the operator and by the speed of the said driven shaft for so regulating the speed of the said driving shaft as to maintain the said driven shaft at whatever substantially constant speed may be willed by the operator.

16. In machine control mechanism, the combination of mechanism for governing the speed of a driving motor and mechanism for automatically varying the ratio of the speed of the machine to the speed of the said motor in inverse proportion to the degree of resistance offered to the operation of the said machine.

17. In machine control mechanism, the combination of means under the control of the operator for regulating the normal speed of a driving motor, mechanism for automatically varying the ratio of the speed of the machine to the speed of the said motor in inverse proportion to each change in the degree of resistance offered to the operation of the said machine, and means controlled by each change in the speed of the said machine for varying the speed of the said motor above or below the said normal speed in inverse proportion to the variations in the speed of the said machine.

18. In machine control mechanism, the combination of a motor operated driving shaft, a driven shaft, mechanism adapted to be adjusted to vary the ratio of the speed of the said driven shaft to the speed of the said driving shaft, a control lever adapted to govern the normal speed of the said driving shaft according to the position of the said control lever, automatic means adapted to vary the speed of the said driving shaft above or below the said normal speed in inverse proportion to each change in the speed of the said driven shaft, and means adapting the said control lever to govern the direction of rotation of the said driven shaft according to the position of the said control lever.

19. In machine control mechanism, the combination of a motor operated driving shaft, a driven shaft, mechanism adapted to automatically vary the ratio of the speed of the said driven shaft to the speed of the said driving shaft in inverse proportion to each change in the degree of resistance offered to the rotation of the said driven shaft, a control lever adapted to govern the normal speed of the said driving shaft according to the position of the said control lever with respect to a fixed plate having graduations thereon, automatic means adapted to vary the speed of the said driving shaft above or below the said normal speed in inverse proportion to each change in the speed of the said driven shaft, and means adapting the said control lever to govern the direction of rotation of the said driven shaft according to the position of the said control lever with respect to the said fixed plate.

CHARLES H. GILL.